US012643264B2

(12) United States Patent
Parrinello et al.

(10) Patent No.: US 12,643,264 B2
(45) Date of Patent: Jun. 2, 2026

(54) APPARATUS AND METHOD FOR MAKING OBJECTS FROM RECYCLED POLYMERIC MATERIAL

(71) Applicant: SACMI COOPERATIVA MECCANICI IMOLA SOCIETA' COOPERATIVA, Imola (IT)

(72) Inventors: Fiorenzo Parrinello, Medicina (IT); Fabrizio Pucci, Castel Guelfo di Bologna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 263 days.

(21) Appl. No.: 17/797,167

(22) PCT Filed: Feb. 19, 2021

(86) PCT No.: PCT/IB2021/051444
§ 371 (c)(1),
(2) Date: Aug. 3, 2022

(87) PCT Pub. No.: WO2021/165917
PCT Pub. Date: Aug. 26, 2021

(65) Prior Publication Data
US 2023/0048314 A1      Feb. 16, 2023

(30) Foreign Application Priority Data
Feb. 19, 2020     (IT) ........................ 102020000003383

(51) Int. Cl.
*B29B 11/12*          (2006.01)
*B29B 13/02*          (2006.01)
(Continued)

(52) U.S. Cl.
CPC ............ *B29B 11/12* (2013.01); *B29B 13/022* (2013.01); *B29C 49/04* (2013.01); *B29K 2067/003* (2013.01); *B29K 2105/26* (2013.01)

(58) Field of Classification Search
None
See application file for complete search history.

(56) References Cited

U.S. PATENT DOCUMENTS 6,056,901 A      5/2000  Hamatani
6,576,172 B1     6/2003  Ario et al.
(Continued)

FOREIGN PATENT DOCUMENTS

CN         101186084         5/2008
CN         103561934 A       2/2014
(Continued)

OTHER PUBLICATIONS

Japanese Office action issued in JP-2022-549682 on Aug. 29, 2023 (with English translation), 7 pages.

*Primary Examiner* — Joseph S Del Sole
(74) *Attorney, Agent, or Firm* — Chrisman Gallo Tochtrop LLC

(57)          ABSTRACT

An apparatus comprises a nozzle for supplying a flow of polymeric material, a separating element for separating a dose of polymeric material from the flow supplied by the nozzle, at least one mould for making an object by compression moulding the dose, at least one conveying element for conveying the dose separated by the separating element towards the mould. The conveying element is movable along a path in an atmospheric environment. The apparatus further comprises a recycling device intended for receiving a polymeric material to be recycled and for providing at its outfeed a melted regenerated polymeric material suitable for being moulded. The nozzle is connected to the recycling device so (Continued)

that the nozzle is fed with the regenerated polymeric material coming from the recycling device.

18 Claims, 2 Drawing Sheets

(51) Int. Cl.

| | | |
|---|---|---|
| *B29C 49/04* | (2006.01) | |
| *B29K 67/00* | (2006.01) | |
| *B29K 105/26* | (2006.01) | |

(56) References Cited

U.S. PATENT DOCUMENTS

| | | | |
|---|---|---|---|
| 7,625,953 | B2 | 12/2009 | Nising |
| 7,855,237 | B2 | 12/2010 | Nising |
| 8,702,415 | B2 | 4/2014 | Monzen |
| 9,576,172 | B2 | 2/2017 | Huang et al. |
| 11,224,999 | B2 | 1/2022 | Parrinello et al. |
| 11,878,448 | B2 | 1/2024 | Parrinello et al. |
| 2009/0263045 | A1 | 10/2009 | Szelski |
| 2013/0065053 | A1 | 3/2013 | Kikuchi |
| 2019/0126512 | A1 | 5/2019 | Gribaudo et al. |
| 2020/0276738 | A1 | 9/2020 | Parrinello et al. |

FOREIGN PATENT DOCUMENTS

| | | | | |
|---|---|---|---|---|
| CN | 107530922 | | 1/2018 | |
| CN | 109414863 | | 3/2019 | |
| EP | 3332934 | A1 | 6/2018 | |
| JP | H11070588 | A | 3/1999 | |
| JP | 2004168039 | A | 6/2004 | |
| JP | 2005105091 | A | 4/2005 | |
| JP | 2009073095 | A | 4/2009 | |
| JP | 2012007014 | A | 1/2012 | |
| JP | 2016221772 | A | 12/2016 | |
| JP | 2019527632 | A | 10/2019 | |
| WO | 2017183048 | A1 | 10/2017 | |
| WO | WO-2017208143 | A1 * | 12/2017 | ............ B29C 43/02 |
| WO | 2018104613 | | 6/2018 | |

* cited by examiner

APPARATUS AND METHOD FOR MAKING OBJECTS FROM RECYCLED POLYMERIC MATERIAL

The invention relates to an apparatus and a method for making objects by moulding, using a recycled polymeric material.

The apparatus and the method according to the invention may be used for making objects such as containers, preforms for obtaining containers by means of blowing or stretch-blow moulding, caps for containers or other concave objects. More generally, the apparatus and the method according to the invention may be used for making any type of object obtainable by means of moulding.

The polymeric material usable by the apparatus and in the method according to the invention may be polyethylene terephthalate (PET), or in general any other polymeric material which, in a recycling device, can be regenerated and again rendered suitable for being moulded.

There are prior art recycling devices intended to receive at infeed a polymeric material to be recycled and to melt that material, regenerating it and rendering it suitable for making new objects by means of moulding. The polymeric material which the recycling devices receive at infeed may be in the form of pieces or fragments obtained by grinding the objects to be recycled. The prior art recycling devices provide a continuous flow of melted regenerated polymeric material, which may be used for making solid pellets intended for feeding injection moulding machines.

In the injection moulding machines, the solid pellets made by the recycling device are again melted in an extruding and plasticizing device. The latter produces a melted polymeric material, which is injected into one or more moulds to form the desired object.

One defect of the prior art described above is linked to the high energy consumption due to the need to melt the material to be recycled in the recycling device, to solidify the regenerated material at the recycling device outfeed for making the pellets, and to melt the pellets again in order to obtain a melted polymeric material with which the injection moulds can be fed.

These operations also require considerable time periods.

WO 2017/183048 describes a device for making preforms from thermoplastic resin flakes, comprising a contamination apparatus for removing contaminants from the thermoplastic resin flakes, and an injection moulding apparatus for injecting and moulding the thermoplastic resin arriving from the decontamination device. The injection moulding apparatus described in WO 2017/183048 may be of the rotary type, in which case the injection moulding apparatus comprises a plasticizing device having an outfeed connected to a rotary distribution mechanism, which distributes the thermoplastic resin arriving from the plasticizing device to a plurality of moulds mounted on a rotary platform.

A drawback of the device described in WO 2017/183048 is that the thermoplastic resin arriving from the decontamination device is subjected to high stresses when it is forced to pass in the narrow transit ducts interposed between the plasticizing device and the moulds, in particular inside the rotary distribution mechanism. These high stresses may cause a degradation of the thermoplastic resin and consequently a worsening of the properties of the objects formed.

Further examples of known apparatuses are disclosed in U.S. Pat. No. 9,576,172 and in EP 3332934.

An object of the invention is to improve the apparatuses and the methods for forming objects by moulding a regenerated polymeric material.

Another object is to provide an apparatus and a method for making objects from regenerated polymeric material, which functions with limited energy consumption.

Another object is to provide an apparatus and a method for making objects from regenerated polymeric material which allow optimisation of production times.

Another object is to provide an apparatus and a method for making objects from regenerated polymeric material, wherein the polymeric material is subjected to limited stresses before the moulding.

Yet another object is to provide an apparatus and a method for making objects from regenerated polymeric material, wherein, before the moulding, the polymeric material is handled in a way such that its quality remains good. In a first aspect of the invention, there is provided an apparatus comprising a nozzle for supplying a flow of polymeric material, a separating element for separating a dose of polymeric material from said flow, at least one mould for making an object by compression moulding the dose, at least one conveying element movable along a path in an atmospheric environment for conveying the dose separated by the separating element towards said at least one mould, the apparatus also comprising a recycling device intended for receiving a polymeric material to be recycled and for providing at its outfeed a melted regenerated polymeric material suitable for being moulded, wherein the nozzle is connected to the recycling device so that the nozzle is fed with said melted regenerated polymeric material.

Owing to the first aspect of the invention, it is possible to obtain an object made from regenerated polymeric material while limiting the energy consumption and the time necessary for making the object. Indeed, by connecting the nozzle to the recycling device, the not yet solidified regenerated polymeric material produced by the recycling device can directly feed the mould. It is therefore possible to avoid cooling the melted regenerated polymeric material exiting the recycling device in order to obtain solid pellets, and subsequently melting the pellets so as to obtain melted material with which to feed the mould. That allows savings in both energy which, in the prior art, was necessary for obtaining the pellets and above all for melting them again, and time for carrying out the related operations.

Moreover, minimising the cooling and heating thermal cycles to which the regenerated polymeric material is subjected makes it possible to avoid its degradation and to keep its quality good.

Moreover, owing to compression moulding, it is possible to avoid or in any case minimise the transit of the melted regenerated polymeric material inside narrow transit ducts, which allows a reduction in the stresses acting on the regenerated polymeric material before the moulding and avoids its degradation. In particular, the melted regenerated polymeric material is no longer stressed by passing through rotary distribution mechanisms having narrow transit ducts.

The conveying element movable along a path in an atmospheric environment, along which the dose is in contact with atmospheric air, guarantees that the regenerated polymeric material which enters the mould is of good quality. Indeed, when the regenerated polymeric material makes contact with the atmospheric air, several volatile contaminating substances initially present in the material may be released.

In one embodiment, interposed between the recycling device and the nozzle there may be a homogenizing device, for thermally homogenizing the melted regenerated polymeric material which flows towards the nozzle.

Indeed, the melted regenerated polymeric material arriving from the recycling device, although having temperatures generally higher than the melting point, may have an internal temperature distribution that is not homogeneous. More specifically, inside the melted regenerated polymeric material arriving from the recycling device there may be portions of material having a temperature very close to the melting point, and further portions of material having a temperature even several tens of degrees higher than the melting point. The hotter portions of material tend to easily degrade, with more consequent worsening of the quality of the moulded object.

In one embodiment, the homogenizing device comprises a heat exchanger configured for cooling the melted regenerated polymeric material.

That allows the distribution of temperatures inside the melted regenerated polymeric material to be made uniform towards a lower limit value, which may for example coincide with the melting point. This avoids, inside the melted regenerated polymeric material, the presence of portions having a temperature much higher than the melting point, which could involve a local degradation of the material, as well as unevenness in its flow rate.

In one embodiment, the heat exchanger is configured for bringing the average temperature of the regenerated polymeric material to a value lower than the melting point, but higher than the crystallization temperature of the polymeric material in question.

That allows shortening of the period of time during which the object must remain inside the mould in order to be cooled to a temperature which allows it to be handled without damaging it. Indeed, when the regenerated polymeric material enters the mould, it already has a temperature lower than the melting point, and the object formed may be cooled more rapidly than would be the case if its starting temperature were higher than the melting point.

In a second aspect of the invention, there is provided a method comprising the steps of supplying a flow of polymeric material by means of a nozzle, separating a dose of polymeric material from said flow, making an object by compression moulding the dose in a mould, wherein the dose separated from said flow is conveyed towards the mould along a path in an atmospheric environment, and wherein the flow of polymeric material arrives from a recycling device which receives a polymeric material to be recycled and provides at its outfeed a melted regenerated polymeric material suitable for being moulded, the nozzle being connected to the recycling device so that the nozzle is fed with the melted regenerated polymeric material.

The method provided by the second aspect of the invention allows the obtainment of the advantages previously described with reference to the first aspect of the invention.

The invention can be better understood and implemented with reference to the accompanying drawings, which illustrate an example, non-limiting embodiment, wherein:

FIG. 1 shows an apparatus 1 for making objects by means of compression moulding of a regenerated polymeric material.

Figure 1:
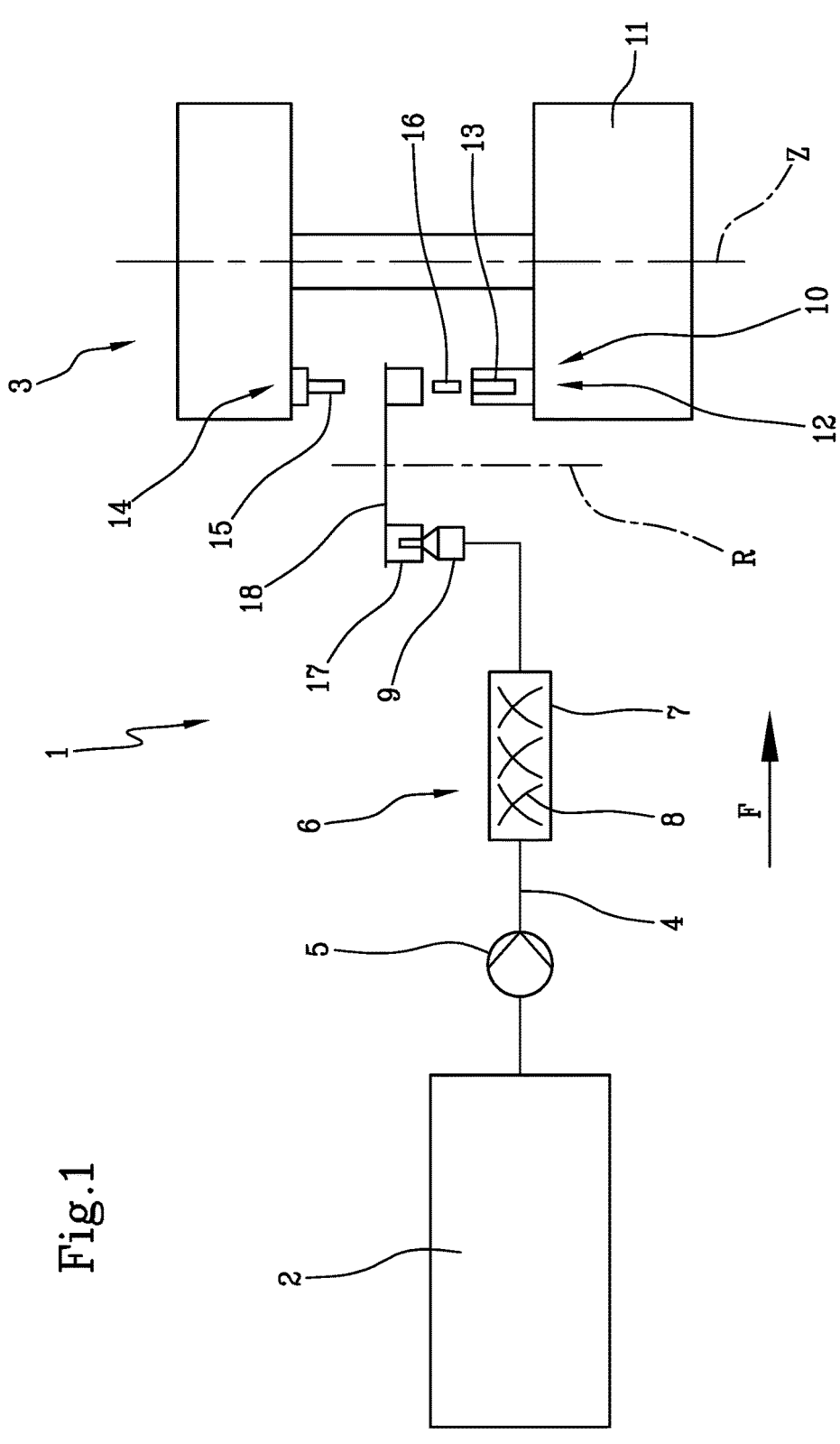
FIG. 1 is a diagram showing an apparatus for making objects.

The regenerated polymeric material usable in the apparatus 1 may be any polymeric material which, after having been used, can be melted again for being subjected to another moulding process, for example but not exclusively polyethylene terephthalate (PET). The objects which the apparatus 1 is capable of making may be objects of any type obtainable by means of compression moulding, for example containers, caps or preforms for containers.

The apparatus 1 comprises a recycling device 2 suitable for being fed with a polymeric material to be recycled, for example in the form of flakes or slivers obtained by grinding an object made of polymeric material, such as a bottle, a thermoformed container for foods, or other item.

The recycling device 2 may be configured to perform mechanical recycling of the polymeric material. In more detail, the recycling device 2 may operate according to the solid state polycondensation (SSP) or liquid state polycondensation (LSP) technology.

The recycling device 2 is capable of providing, at the outfeed, a flow, for example continuous, of melted regenerated polymeric material suitable for being moulded.

The apparatus 1 also comprises a compression moulding device 3 positioned downstream of the recycling device 2 and connected to the latter, in such a way that the compression moulding device 3 receives the regenerated polymeric material arriving from the recycling device 2 and uses it for compression moulding objects, without the regenerated polymeric material being solidified beforehand. The recycling device 2 and the compression moulding device 3 therefore define a production plant wherein the recycling device 2 is connected in line with the compression moulding device 3.

Interposed between the recycling device 2 and the compression moulding device 3 there is a connecting line 4 for connecting the recycling device 2 and the compression moulding device 3.

Along the connecting line 4 there may be a pump 5, which allows the sending to the compression moulding device 3 of a substantially constant flow rate of polymeric material arriving from the recycling device 2. In this way, the regenerated polymeric material can be precisely dosed at the infeed of the compression moulding device 3.

The pump 5 may be of the type with gears or of any other type, which is suitable for processing polymeric material in the melted state or in any case in a highly viscous fluid state.

Positioned along the connecting line 4 there may be a homogenizing device 6, suitable for rendering uniform the temperature inside the regenerated polymeric material travelling towards the compression device 3.

Indeed, the melted polymeric material arriving from the recycling device 2 generally has a temperature higher than the melting point. However, the temperature distribution inside that material may not be homogeneous. More specifically, it may be the case that inside the flow of melted polymeric material which exits the recycling device 2 there are cooler portions having a temperature close to the melting point and hotter portions having a temperature even several tens of degrees higher than the melting point.

For example, if the polymeric material is PET, which has a melting point of approximately 260*C, the temperature of the flow of PET exiting the recycling device 2 is generally higher than 260° C., because the material has been completely melted inside the recycling device 2. However, in the flow of melted polymeric material upstream of the homogenizing device 6 there may be relatively cold portions, having a temperature of 260-270° C., together with hotter portions having a temperature of 300-310° C. Therefore, in this example, the temperature of the PET which enters the homogenizing device 6 may be variable between 260° C. and 310° C.

The homogenizing device 6 makes it possible to render uniform the temperatures of the flow of polymeric material towards a lower limit value, so as to eliminate the higher temperature peaks inside the flow of regenerated polymeric material and to reduce the temperature variability range inside that flow.

In other words, operation of the homogenizing device 6 tends to cool the melted regenerated polymeric material, so as to hinder its degradation. The homogenizing device 6 acts on the hotter portions of melted regenerated polymeric material, reducing their temperature in such a way that the regenerated polymeric material can remain inside the homogenizing device 6 without degrading.

The homogenizing device 6 may comprise a heat exchanger, configured for cooling the hotter portions of regenerated polymeric material which passes through it, in such a way was to reduce the temperature variability range of that material.

The heat exchanger may be of the counter-current type, that is to say, it may comprise a hollow space wherein a cooling fluid flows in a direction of flow opposite to a direction of feed F of the regenerated polymeric material. The direction of feed F goes from the recycling device 2 towards the compression moulding device 3.

The heat exchanger may comprise a static mixer 7. The latter may comprise a duct in which the regenerated polymeric material passes, inside which a mixing element 8 is positioned which is schematically illustrated in FIG. 1. The mixing element 8 comprises a plurality of diverting bars arranged in a stationary position for homogenizing the flow of regenerated polymeric material both thermally and, if necessary, in terms of the composition. In particular, diverting bars may divide the main flow of melted regenerated polymeric material into a plurality of secondary flows which mix with each other along the path inside the static mixer 7. The secondary flows into which the main flow is divided allow an increase in the heat exchange surface area and effective rendering uniform of the temperatures of the regenerated melted polymeric material.

The static mixer 7 is equipped with an outer jacket wherein a thermal conditioning fluid flows, in particular a cooling fluid, which may for example flow in a direction opposite to the direction of feed F.

In an alternative embodiment not shown, the homogenizing device 6 may comprise, in place of the static mixer 7, a dynamic mixer, that is to say, provided with mixing elements which move during operation.

The homogenizing device 6 may also comprise, in place of the static mixer 7, a shell and tube heat exchanger, or a cascade extruder or a satellite extruder, or even a suitably conditioned twin screw extruder.

In one embodiment, the homogenizing device 6 is configured for homogenizing the temperature of the flow of regenerated polymeric material in such a way that, at the outfeed of the homogenizing device 6, that temperature is within a range centred around a value lower than the melting point of the polymeric material in question.

More generally, at the outfeed of the homogenizing device 6 the flow of regenerated polymeric material may have a temperature lower than the melting point.

For example, in the case of PET, the temperature at the outfeed of the homogenizing device 6 may be 240*C±5° C.

If the polymeric material is semi-crystalline, for example such as PET, the temperature of the flow of melted regenerated polymeric material at the outfeed of the homogenizing device 6 may be higher than the crystallization temperature.

In this way, the melted regenerated polymeric material is moulded in the compression moulding device 3 while it has a working temperature which is on average lower than the melting point. That allows a reduction in the time for which the formed object remains in the mould, since the formed object can be more rapidly cooled to a temperature at which it can be handled without being damaged, and consequently can be extracted from the mould. This makes it possible to reduce the cycle time.

In an alternative embodiment, the homogenizing device 6 is configured for homogenizing the temperature of the flow of regenerated polymeric material in such a way that, downstream of the homogenizing device 6, that temperature is within a range centred around the melting point, for example 260° C.±5*C in the case of PET.

In general, the flow of regenerated polymeric material exiting the homogenizing device 6 has a temperature distribution which is much more homogeneous than the temperature distribution upstream of the homogenizing device 6. In other words, downstream of the homogenizing device 6, the temperature of the melted regenerated polymeric material is variable in a narrower range than the range in which the temperature of the melted regenerated polymeric material varied upstream of the homogenizing device 6.

For example, whilst upstream of the homogenizing device 6 the temperature of the regenerated polymeric material may be variable in a 50° C. range, downstream of the homogenizing device 6 the temperature of the regenerated polymeric material may be variable in a 10° C. range.

Therefore, the range in which the temperature of the regenerated polymeric material is variable has an extent which is at least halved in the homogenizing device 6, preferably reduced to less than one quarter of the value that said extent had upstream of the homogenizing device 6.

This prevents, in the homogenizing device 6 and downstream of the latter, the presence in the flow of regenerated polymeric material of excessively hot portions, which could rapidly degrade.

Positioned downstream of the homogenizing device 6 there is a nozzle 9 through which the flow of regenerated polymeric material arriving from the recycling device 2 can be supplied in an atmospheric environment.

The nozzle 9 is positioned at an end of the connecting line 4 opposite to a further end of the connecting line 4, which exits the recycling device 2. Therefore, the nozzle 9 is connected to the recycling device 2.

The nozzle 9 is positioned immediately downstream of the homogenizing device 6, in such a way that the flow of regenerated polymeric material exiting the homogenizing device 6 rapidly reaches the nozzle 9.

Inside the nozzle 9 there is a transit duct for the regenerated polymeric material, having relatively large dimensions, for example a diameter in the region of 0.5-2 cm.

In general, the diameter of the transit duct of the nozzle 9 is significantly greater than the diameter of the injecting ducts normally provided in an injection mould for making objects of the same type as the objects made by the compression moulding device 3.

Thanks to the relatively large diameter of the transit duct provided in the nozzle 9, the regenerated polymeric material is subjected to limited stresses as it passes through the nozzle 9.

In the example shown, the nozzle 9 has a supplying opening facing upwards, in such a way that the flow of regenerated polymeric material supplied by the nozzle 9 is fed vertically from the bottom upwards. However, this condition is not necessary, and the supplying opening of the nozzle 9 could even be facing in different orientations, for example downwards or according to a horizontal line, or even a slanting line relative to the horizontal.

The compression moulding device 3 also comprises at least one mould 10 for making an object by means of compression moulding. In the example shown, a plurality of o moulds 10 is provided, for example they are mounted in a peripheral region of a moulding carrousel 11.

The moulding carrousel 11 may be rotatable about an axis Z, for example but not necessarily positioned vertically.

Other arrangements of the moulds 10 are possible.

Each mould 10 comprises a female part 12 having a cavity 13, and a male part 14 having a punch 15.

The female part 12 and the male part 14 of each mould 10 are aligned with each other along a moulding axis which may for example be vertical.

In the example shown, the female part 12 is positioned below the male part 14, but this condition is not necessary.

The female part 12 and the male part 14 are movable relative to each other along a line parallel to the moulding axis, so as to move towards each other or, alternatively, to move away from each other. In more detail, the female part 12 and the female part 14 are movable relative to each other between an open position, shown in FIG. 1, and a closed position not shown.

In the open position, the female part 12 and the male part 14 are spaced apart, so that between the female part 12 and the male part 14 it is possible to insert a dose 16 of polymeric material, which has been separated from the nozzle 9.

In the example shown, the dose 16 is inserted into the cavity 13, but this condition is not necessary since it depends on the arrangement of the male part 12 and of the female part 14 relative to each other.

In the open position, it is also possible to remove a formed object from the mould 10.

In the closed position, the female part 12 and the male part 14 are near each other, in such a way that defined between them there is a forming chamber having a geometry corresponding to the shape of the object to be obtained. The compression moulding device 3 also comprises a separating element suitable for periodically interacting with the flow of regenerated polymeric material exiting the nozzle 9 for separating from that flow the doses 16 of polymeric material.

There is also at least one conveying element 17 provided, for conveying a dose 16 from the nozzle 9 towards a mould 10.

The conveying element 17 may be shaped for example as a concave element extending about a vertical axis, suitable for passing near the nozzle 9, in particular above the latter, for separating from it a dose 16 of regenerated polymeric material. In this case, an edge zone of the conveying element 17 which is periodically located in a position facing the nozzle 9 (that is to say, in the example shown, a lower edge zone of the conveying element 17) acts as a separating element, for separating the dose 16 from the flow of regenerated polymeric material exiting the nozzle 9.

In an embodiment not shown, the separating element may be separate from and independent of the conveying element 17. For example, the separating element could comprise a rotary blade, not connected to the conveying element 17, rotatable about an axis in such a way as to periodically pass near the nozzle 9, for separating the dose 16 from it.

The conveying element 17 is movable along a path going from the nozzle 9 towards a mould 10.

In the example shown, there is a plurality of conveying elements 17, which may for example be supported by a conveying carrousel 18.

The conveying carrousel 18 is rotatable about an axis of rotation R, which in the example shown is parallel to the axis Z of the moulding carrousel 11. More specifically, in the example shown the axis of rotation R is vertical.

Therefore, each conveying element 17 is movable along a closed path, which in the example shown is circular.

As it travels along its path, the conveying element 17 may adopt a pick-up position, wherein the conveying element 17 is located near the nozzle 9, in particular above the nozzle 9, for separating a dose 16 from it. Due to its highly viscous fluid state, the dose 16 remains adhering to the conveying element 17 which, rotating about the axis of rotation R, conveys it towards the mould 10. The conveying element 17 may also be located in a delivery position wherein it is interposed between the female part 12 and the male part 14 for releasing the dose 16 into the mould 10, for example with the aid of pneumatic or mechanical means.

As it travels along its path from the nozzle 9 to the mould 10, or more generally from the pick-up position to the delivery position, the conveying element 17 is located in an atmospheric environment, that is to say, in an open environment, so that the dose 16 is in direct contact with the air. In this way, several volatile contaminating substances may be released from the dose 17 and disperse into the atmospheric environment. That allows an improvement in the quality of the regenerated polymeric material which forms the dose 16.

During operation, the polymeric material to be recycled, still in the solid state, is introduced into the recycling device 2. Here the polymeric material is heated to a temperature higher than the melting point and subjected to a regeneration treatment which may comprise multiple steps, for example filtering, transit in a vacuum environment, crystallization and other.

At the outfeed of the recycling device 2, a flow of melted regenerated polymeric material is obtained which is fed in the direction of feed F by the pump 5. The pump 5 ensures that the flow rate of the melted regenerated polymeric material is substantially constant, in such a way that it is possible to separate from the flow of regenerated polymeric material doses 16 having a substantially constant mass.

The melted regenerated polymeric material then passes inside the homogenizing device 6, wherein that material is rendered thermally uniform, and then it comes out of the nozzle 9.

The separating element separates from the nozzle 9 a dose 16, which is picked up by the conveying element 17 located in the pick-up position. The conveying element 17 reaches the delivery position, wherein it releases the dose 16 into the mould 10, which is in the open position.

Then, the mould 10 moves to the closed position for forming the dose 16 into an object. When the latter has cooled enough inside the mould 10, the mould 10 can be opened and the object extracted.

At this point, it is possible to start a new moulding cycle.

In the example described above, reference was made to an apparatus 1 comprising a compression moulding device 3 wherein the objects, after having been formed in the moulds 10, are extracted from the moulds 10 and conveyed away from the compression moulding device 3.

If the object obtained by compression moulding the dose 16 is a preform, it is possible to convey the object to a storage area and, after a predetermined period, to subject the object to blowing or stretch-blow moulding so as to obtain the container from it, on a different machine to that to which the mould 10 belongs.

In an embodiment not shown, the compression moulding device 3 may be equipped with one or more moulds 10 which are configured for making a preform from the dose 16 and, immediately after the preform 16 has been obtained, for obtaining from it a container (for example a bottle) by means of blowing or stretch-blow moulding.

In other words, if the object obtained from the dose 16 is a preform, it is possible to make the container from it by means of a blowing or stretch-blow moulding operation performed in the same compression moulding device 3 to which the mould 10 belongs. That may be done by keeping the object engaged with a specially designed punch, and substituting the female part 12 with a female part of a blowing mould wherein the object can be subjected to blowing or to stretch-blow moulding.

The apparatus 1 may also operate using, in place of PET referred to above, other polymeric materials, in particular thermoplastic resins.

In general, the apparatus 1 allows good quality objects to be made by means of compression moulding of a recycled polymeric material, at the same time reducing energy consumption and the cycle time.

It is desirable that the regenerated polymeric material coming from the recycling device 2 and directed towards the compression moulding device 3 has a viscosity having a preset value, or more realistically a viscosity falling within a preset range.

This makes possible to improve the steps of separating the dose 16 from the nozzle 9, conveying the dose 16 towards the mould 10, introducing the dose 16 into the mould 10 and filling the mould 10 with the regenerated polymeric material forming the dose 16. In order to optimize these steps, it is desirable to have a viscosity of the regenerated polymeric material which is neither too low, nor too high. Furthermore, the performances of the moulded object are improved if the viscosity of the regenerated polymeric material is relatively high.

It is therefore appropriate to control the viscosity of the regenerated polymeric material, for reasons both due to the quality of the moulded object and due to the control of the production process.

Figure 2:
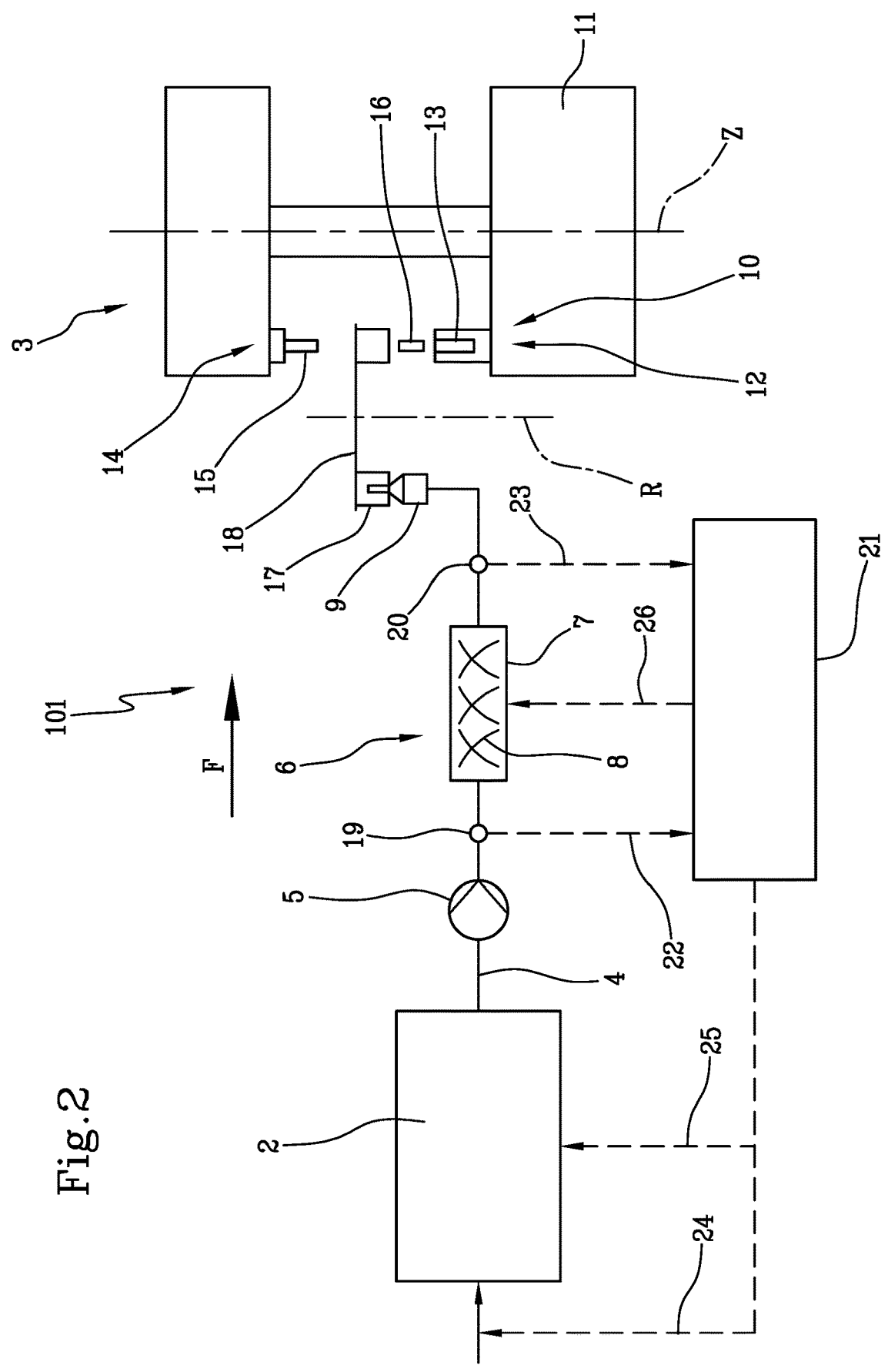
FIG. 2 is a diagram like that of FIG. 1, showing an apparatus for making objects according to an alterative embodiment.

FIG. 2 shows an apparatus 101 according to an alternative embodiment, in which the viscosity control referred to above can be carried out. In the apparatus 101, the components common to the apparatus 1 shown in FIG. 1 are indicated with the same reference numerals used in FIG. 1 and are not described again in detail.

The apparatus 101 differs from the apparatus 1 mainly because it comprises at least one viscosity measuring element positioned along the connecting line 4, that is to say in a position interposed between the recycling device 2 and the compression moulding device 3. More specifically, in the example shown, the apparatus 101 comprises a first viscosity measuring element 19 positioned along the connecting line 4 in a position upstream of the homogenizing device 6, for example in a position interposed between the pump 5 and the homogenizing device 6.

The apparatus 101 further comprises a second viscosity measuring element 20, positioned along the connecting line 4, in a position downstream of the homogenizing device 6, for example in a position interposed between the homogenizing device 6 and the nozzle 9.

The first viscosity measuring element 19 and the second viscosity measuring element 20 are configured to measure, in line, the viscosity of the regenerated polymeric material which comes from the recycling device 2 and is directed towards the compression moulding device 3.

The first viscosity measuring element 19 and the second viscosity measuring element 20 are connected to a control unit 21, for sending to the control unit 21 the measured values of viscosity, as indicated by the arrows 22 and 23.

The control unit 21 compares the measured values of viscosity with the reference values of viscosity that the regenerated polymeric material should have and, if the measured values of viscosity are different from the reference values of viscosity, acts with a feedback control on at least one parameter which affects viscosity of the polymeric material.

In one embodiment, it is possible to change the viscosity by acting with a feedback control on the composition of the material which enters into the recycling device 2, be it a material of a single type or a mixture of different materials, as indicated by the arrow 24.

The recycling device 2 can be fed with a mixture of different materials when, for example, a material is added to a main polymeric material to be recycled, said material having the purpose of modifying one ore more properties of the main material.

Consider for example the high-density polyethylene (HDPE). One of the critical properties of the recycled high-density polyethylene is its environmental stress cracking resistance, which is also indicated by ESCR. If a regenerated high-density polyethylene has values of ESCR which are not acceptable, it is possible to add a polymeric material (even virgin) having high ESCR to the high-density polyethylene to be recycled which enters into the recycling device 2. The materials having high ESCR generally cause an increase in viscosity of the final mixture.

Hence, if from the viscosity measurement carried out by the first viscosity measuring element 19 and/or by the second viscosity measuring element 20 it results that the viscosity of the regenerated polymeric material is not compliant with what is expected, it is possible to change with a feedback control the composition of the mixture of materials entering into the recycling device 2, for example by increasing or decreasing the amount of material having high ESCR which is introduced into the recycling device 2 together with the main polymeric material to be recycled.

More generally, it is possible to change with a feedback control the viscosity of the regenerated polymeric material by acting on the composition of the mixture of materials that are introduced into the recycling device 2, said mixture comprising a main polymeric material to be recycled and an additional material aimed at improving one or more properties of the polymeric material to be recycled. The viscosity may in this case be changed by acting on the amount of additional material which is added to the main polymeric material to be recycled.

It is also possible to feed the recycling device 2 with materials of the same type, for example with a polymer to be recycled and with a virgin polymer of the same type. This may happen if, for example, polyethylene terephthalate (PET) to be recycled and virgin PET are introduced into the recycling device 2.

In this case, it is possible to change with a feedback control the viscosity of the material which enters into the compression moulding device 3, by acting on the amount of virgin polymeric material which enters into the recycling device 2, with respect to the amount of recycled polymeric material. In addition to the above, or as an alternative to the above, the control unit 21 may be configured to intervene with a feedback control on the recycling device 2, as indicated by the arrow 25, for example by acting with a feedback control on one or more working parameters of the recycling device 2.

More specifically, inside the recycling device 2, the polymeric material (e.g. PET) is chemically treated and improved. The recycling device 2 may be so adjusted that improvement of the polymeric material occurring in the recycling device is more or less relevant, for example by acting on the residence time of the polymeric material in the recycling device 2. Depending on the level of improvement of the polymeric material in the recycling device 2, the viscosity of the regenerated polymeric material exiting from the recycling device 2 varies.

In one embodiment, the control unit 21 can be configured to act with a feedback control on the homogenizing device 6, as indicated by the arrow 26, by adjusting the temperature that the regenerated polymeric material has when leaving the homogenizing device 6.

For example, if the control unit 21 finds out that the viscosity values measured by the first viscosity measuring element 19 and/or by the second viscosity measuring element 20 are less than expected, the control unit adjusts the operating parameters of the homogenizing device 6, so that the regenerated polymeric material exiting from the homogenizing device 6 has a temperature which, as an average, is less than the current one. This causes a viscosity increase with respect to the previously measured value. The contrary occurs if the viscosity values measured by the first viscosity measuring element and/or by the second viscosity measuring element are higher than expected.

In one embodiment, the viscosity of the regenerated polymeric material flowing from the recycling device 2 towards the compression moulding device 3 can be changed by acting on the temperature by means of automatic setting adjustments of the homogenizing device 6, without using the viscosity measurements by the viscosity measuring elements 19, 20, which might be absent in this case.

It is also possible to change the viscosity of the regenerated polymeric material which flows from the recycling device 2 towards the compression moulding device 3 by combining one or more of the ways described above, for example by acting on the working temperature of the homogenizing device 6 and by changing with a feedback control the composition of the material which enters into the recycling device 2.

In an embodiment which is not shown, it is possible to use a single viscosity measuring element, instead of using the first viscosity measuring element 19 and the second viscosity measuring element 20.

If a single viscosity measuring element is used, the latter may be positioned in any position interposed between the recycling device 2 and the nozzle 9, for example upstream or downstream of the homogenizing device 6.

The invention claimed is:

1. An apparatus comprising a nozzle for supplying a flow of polymeric material, a separating element for separating a dose of polymeric material from said flow, at least one mould for making an object by compression moulding the dose, at least one conveying element for conveying the dose separated by the separating element towards said at least one mould, said at least one conveying element being movable along a path in an atmospheric environment, the apparatus further comprising a recycling device configured to receive a polymeric material to be recycled and melt the polymeric material to be recycled, so as to provide at an outfeed of the recycling device a melted regenerated polymeric material suitable for being moulded, wherein the nozzle is connected to the recycling device so that the nozzle is fed with the regenerated polymeric material, the apparatus further comprising at least one viscosity measuring device interposed between the recycling device and the nozzle for measuring viscosity of the regenerated polymeric material, the apparatus further comprising a control unit for receiving as an input the measured value of viscosity, comparing the measured value of viscosity with at least one reference value and changing the viscosity of the regenerated polymeric material with a feedback control.

2. The apparatus according to claim 1, and further comprising a homogenizing device positioned downstream of the recycling device for thermally homogenizing the flow of melted regenerated polymeric material.

3. The apparatus according to claim 2, wherein the homogenizing device comprises a heat exchanger configured to at least partially cool the melted regenerated polymeric material.

4. The apparatus according to claim 2, wherein the homogenizing device is so configured that, at the outfeed of the homogenizing device, the flow of regenerated polymeric material has an average temperature lower than the melting temperature of said polymeric material.

5. The apparatus according to claim 1, wherein inside the nozzle there is provided a transit duct for the regenerated polymeric material, the transit duct having a diameter of between 0.5 cm and 2 cm.

6. The apparatus according to claim 1, and further comprising a pump positioned downstream of the recycling device for sending towards the nozzle a flow of regenerated polymeric material having a substantially constant flow rate.

7. The apparatus according to claim 1, wherein the recycling device is configured to operate according to the liquid state polycondensation (LSP) technology.

8. The apparatus according to claim 1, wherein said at least one mould is configured to make a preform for a container and subsequently obtain a container from the preform by blow moulding or stretch-blow moulding the preform inside said at least one mould.

9. The apparatus according to claim 1, wherein the control unit is configured to change the viscosity of the regenerated polymeric material with a feedback control by acting on the composition of the polymeric material to be recycled which enters into the recycling device.

10. The apparatus according to claim 1, wherein the control unit is configured to change the viscosity of the regenerated polymeric material with a feedback control by acting on at least one operating parameter of the recycling device.

11. The apparatus according to claim 1, and further comprising a homogenizing device positioned downstream of the recycling device for thermally homogenizing the flow of melted regenerated polymeric material, wherein the control unit is configured to change the viscosity of the regenerated polymeric material with a feedback control by acting on the temperature of the regenerated polymeric material in the homogenizing device.

12. The apparatus according to claim 1, and further comprising a homogenizing device positioned downstream of the recycling device for thermally homogenizing the flow of melted regenerated polymeric material, wherein two viscosity measuring elements are provided, which are positioned respectively upstream and downstream of the homogenizing device.

13. A method comprising the steps of supplying a flow of polymeric material with the nozzle of the apparatus of claim 1, separating a dose of polymeric material from said flow, making an object by compression moulding the dose in a mould, wherein the dose separated from said flow is conveyed towards the mould along a path in an atmospheric environment, and wherein the flow of polymeric material arrives from a recycling device which receives a polymeric material to be recycled and provides at an outfeed thereof a melted regenerated polymeric material suitable for being moulded, the nozzle being connected to the recycling device so that the nozzle is fed with the regenerated polymeric material.

14. The method according to claim 13, and further comprising the step of thermally homogenizing the flow of melted regenerated polymeric material, downstream of the recycling device.

15. The method according to claim 14, wherein the step of homogenizing comprises at least partially cooling the melted regenerated polymeric material.

16. The method according to claim 13, and further comprising the step of measuring viscosity of the regenerated polymeric material in a position interposed between the recycling device and the nozzle, comparing the measured value of viscosity with at least one reference value and changing the viscosity of the regenerated polymeric material with a feedback control.

17. The method according to claim 16, wherein the recycling device is fed with the polymeric material to be recycled and with an amount of virgin polymeric material of the same type, and wherein the viscosity of the regenerated polymeric material is changed by acting on the amount of virgin polymeric material with respect to the amount of polymeric material to be recycled.

18. The method according to claim 16, wherein the recycling device is fed with the polymeric material to be recycled and with an additional material which modifies at least one property of the polymeric material to be recycled, and wherein the viscosity of the regenerated polymeric material is changed by acting on the amount of the additional material with respect to the amount of polymeric material to be recycled.

* * * * *